Figure 1:
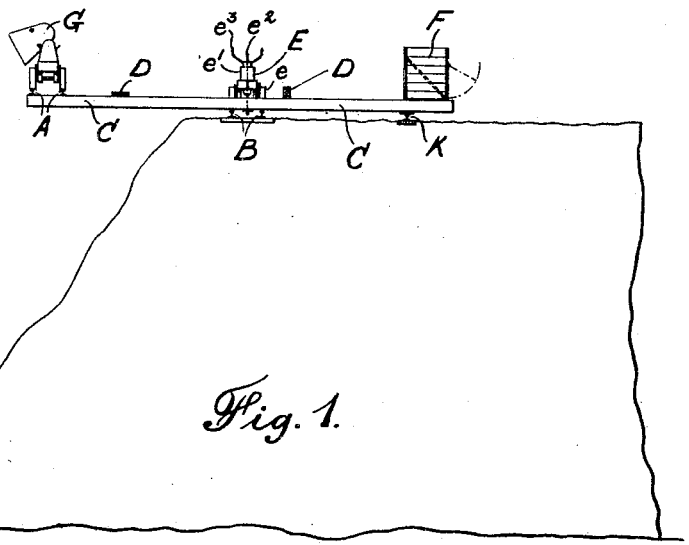

No. 784,700. PATENTED MAR. 14, 1905.
H. A. PENBERTHY & J. B. PITCHFORD.
PORTABLE LOOP FOR DUMP CARS.
APPLICATION FILED JULY 19, 1904.

3 SHEETS—SHEET 1.

Witnesses:
R. Oxendale
J. Scrimgeour.

Inventors:
Henry Arnall Penberthy
John Benjamin Pitchford
by Chas. Oxendale
Attorney No. 784,700. PATENTED MAR. 14, 1905.
H. A. PENBERTHY & J. B. PITCHFORD.
PORTABLE LOOP FOR DUMP CARS.
APPLICATION FILED JULY 19, 1904.

3 SHEETS—SHEET 2.

Witnesses:
R. Bendall
J. Scrimgeour.

Inventors:
Henry Arnall Penberthy
John Benjamin Pitchford
by Chas Bendall
Attorney.

No. 784,700. PATENTED MAR. 14, 1905.
H. A. PENBERTHY & J. B. PITCHFORD.
PORTABLE LOOP FOR DUMP CARS.
APPLICATION FILED JULY 19, 1904.

3 SHEETS—SHEET 3.

Witnesses:
R. Dundale.
J. Scrimgeour.

Inventors:
Henry Arnall Penberthy
John Benjamin Pitchford
by Chas. Dundale.
Attorney No. 784,700. Patented March 14, 1905.

UNITED STATES PATENT OFFICE.

HENRY ARNALL PENBERTHY, OF RANDFONTEIN, AND JOHN BENJAMIN PITCHFORD, OF JOHANNESBURG, TRANSVAAL, ASSIGNORS OF ONE-HALF TO CHARLES ROBINSON AND WILLIAM WEBB BEEBY, OF RANDFONTEIN, TRANSVAAL.

PORTABLE LOOP FOR DUMP-CARS.

SPECIFICATION forming part of Letters Patent No. 784,700, dated March 14, 1905.

Application filed July 19, 1904. Serial No. 217,198.

*To all whom it may concern:*

Be it known that we, HENRY ARNALL PENBERTHY, a subject of the King of England, residing at Randfontein, and JOHN BENJAMIN PITCHFORD, a citizen of the United States, residing at Johannesburg, Transvaal, have invented certain new and useful Improvements in Portable Loops for Dump-Cars, of which the following is a specification.

In dumping or depositing residues or other materials on mine-dumps it is largely the practice to convey the same to the dump in trucks or vehicles which traverse a track or rails laid on the dump as near as possible to the edge or face of the same and to empty the contents of the trucks or vehicles on the top of the dump and then to shovel the material over the edge or face of the dump. As the dump is extended the rails are taken up and relaid nearer the edge, so that the emptying of the trucks or vehicles can be effected as near as possible to the edge to minimize the labor required for shoveling the material.

Now the object of the present invention is to dispense with the manual labor at present required for shoveling the material after it has been deposited on such dumps.

The invention consists, essentially, of a loop from the main line, which loop is so constructed and arranged as to overhang the edge or face of the dump, the loop being preferably constructed so that it may be easily transported or moved from place to place on the dump by hand or otherwise, as may be required.

The invention may be used on mine-dumps or other depositing-sites for dumping coal, rock, minerals, refuse, or other substances or materials which are conveyed by means of trucks or other vehicles traversing a track or rails.

According to our invention the rails forming the loop are laid upon or carried by a structure which may comprise a number of cantalivers suitably braced together to form a rigid frame. The rails of the loop are constructed so that they may be attached to the rails of the main line or track in such manner that the loaded trucks or vehicles can be run off the main line onto the loop and after being emptied of their contents may continue in the same direction and run off the loop onto the main line or track. The overhanging portion of the loop, as also the weight of the loaded truck when it is run onto the loop, may be counterbalanced by means of a weight, or the frame or structure may be anchored to the dump. The loop is constructed so that it may be fixed to the main track in any desired position on the dump. The transportation of the loop may be effected by manual labor; but to facilitate the operation of moving the same we prefer to mount the structure on carriages or bogies which are adapted to traverse the main line or track, so that when the dump is filled up beneath the loop or the material being dumped or deposited reaches the level of the bottom of the rails of the loop the whole structure may be easily moved on the main track or line to place it in another position for dumping. The structure when moving along the loop is maintained equidistant from the main line at all times, should the main line be straight or curved.

When the structure is mounted on and carried by carriages or bogies, means are provided for lifting the structure to transfer the weight thereof to the carriages or bogies in order to facilitate the moving of the loop along the main line or track.

In some cases it may be preferred or found more advantageous to employ a spur or half-loop instead of a loop, in which case the trucks or vehicles would be run onto the spur, emptied, and then run back on the spur to the main line or track.

The invention will now be described in detail by aid of the accompanying drawings, wherein—

Figure 2:
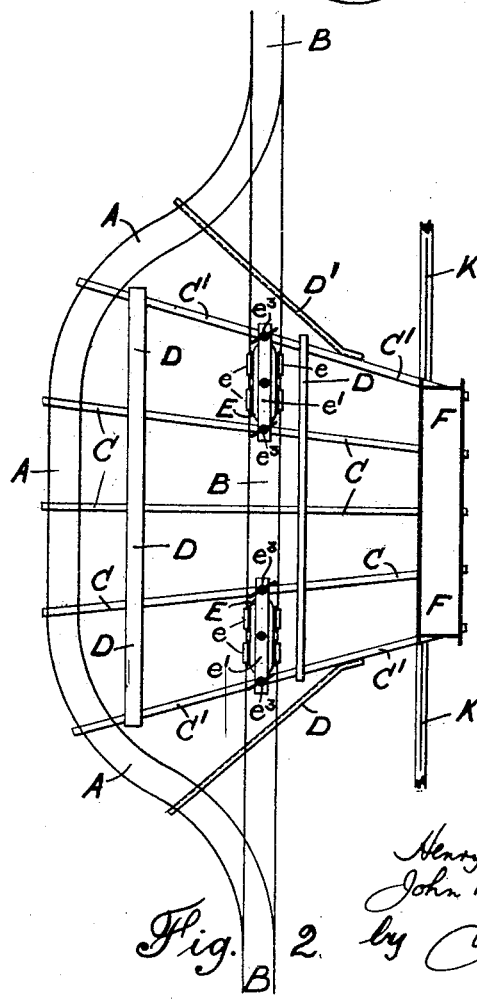
Figure 3:
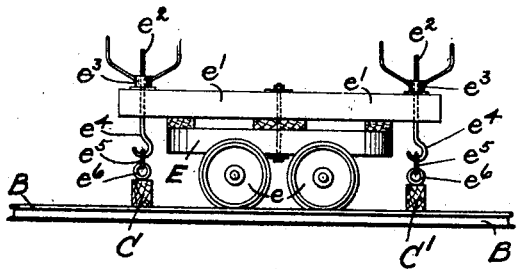
Figure 4:
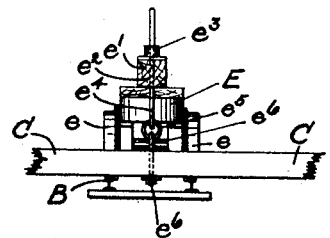
Figure 5:
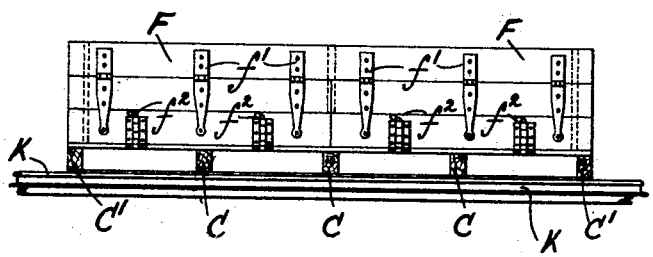
Figure 6:
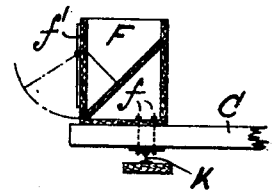
Figure 7:
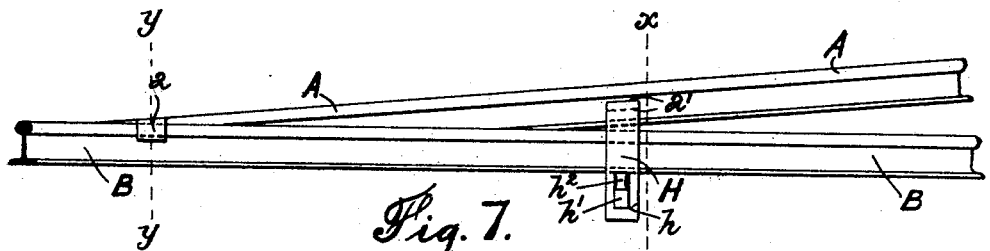
Figure 8:
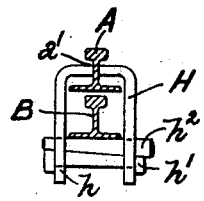
Figure 9:
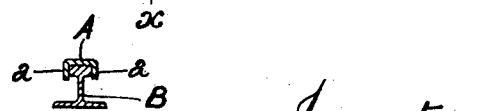
Figure 10:
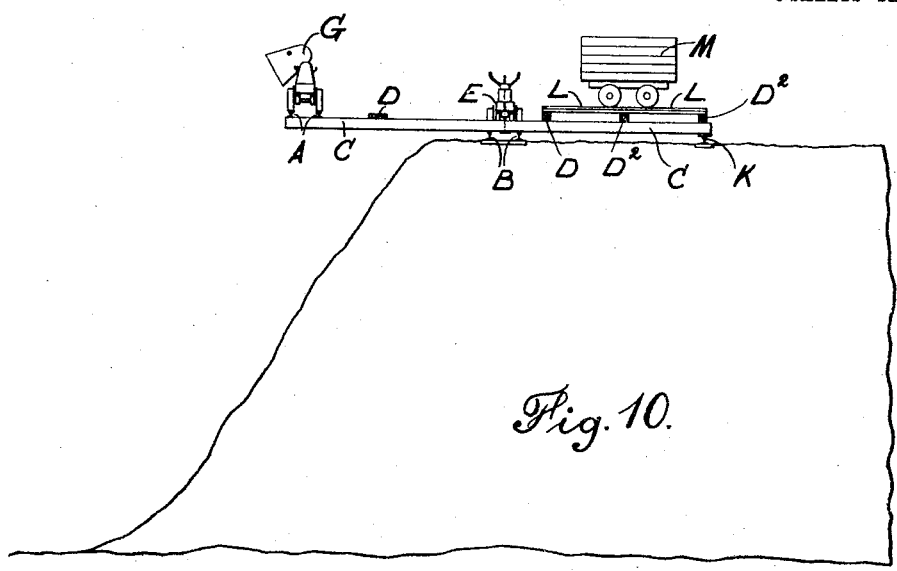
Figure 11:
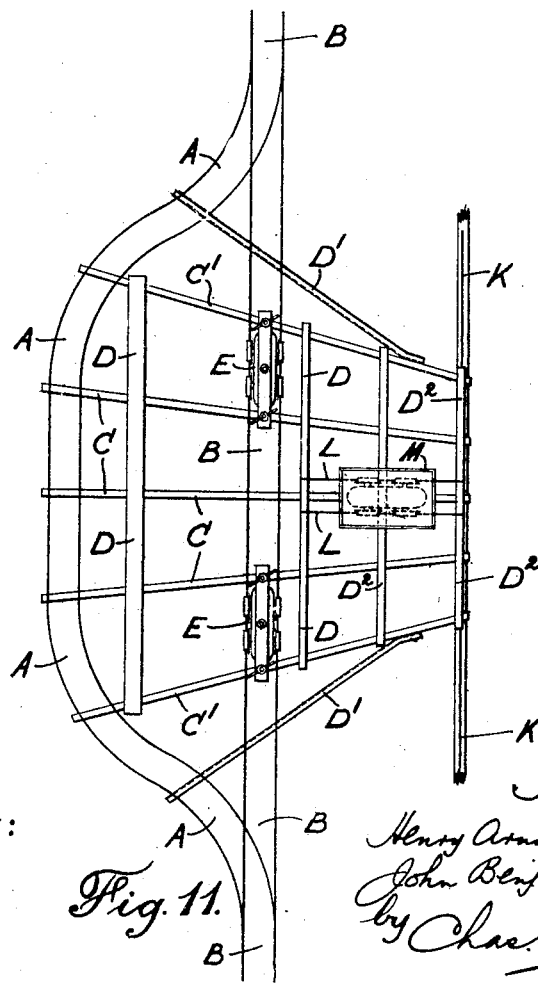

Figure 1 is a sectional elevation of a loop arranged in position on a dump or depositing-site. Fig. 2 is a plan of the loop and portion of the main line. Fig. 3 is a side elevation of one of the carriages or bogies and illustrating the means for lifting the loop when it is desired to alter its position or move it along the main line. Fig. 4 is an end elevation of Fig. 3. Fig. 5 is a side elevation of the weight-box. Fig. 6 is a sectional end elevation of Fig. 5. Fig. 7 is a side elevation of a portion of the main line and one extremity of the loop, showing the means for fixing the latter to the former. Fig. 8 is a section on line $xx$ of Fig. 7. Fig. 9 is a section on line $yy$ of Fig. 7. Fig. 10 is a sectional elevation of the loop arranged in position on a dump or depositing-site, illustrating a modification in the construction of the weight-box. Fig. 11 is a plan of the loop and portion of the main line, showing the modified arrangement.

Similar letters of reference indicate the same or corresponding parts in the several figures of the drawings.

Referring more particularly to the arrangement illustrated in Figs. 1 to 9, the loop is represented at A and the main line at B. The loop A is carried by a number of cantalivers C, which latter are strengthened or rigidly connected by means of stays or braces D. The ends of the loop A at or in proximity to the points where they run off and onto the main line are supported by means of the bars or supports D', which at their other ends are fixed to the two outside cantalivers C'. The framework comprising the cantalivers C C' and braces or stays D, which on the one side carries the loop A, is mounted at or about the center on two or more carriages or bogies. (Illustrated in detail in Figs. 3 and 4.) These carriages or bogies are adapted to traverse the main line B on the dump, and they consist of the undercarriage E, supported by the wheels $e$, which undercarriage E carries the longitudinal bar or beam $e'$. In the ends of the bar or beam $e'$ are arranged screws $e^2$, which may be raised or lowered in the beam $e'$ by means of the nuts $e^3$. The lower ends of the screws $e^2$ may be shaped to form hooks $e^4$, so that they may be attached, by means of a ring $e^5$, to eyebolts $e^6$, fixed in the cantalivers C C'. By this means the whole structure may be raised when it is desired to move the loop A along the main line B and so that the loop A may be lowered onto the top of the dump or onto supports provided for it on the dump after it has been brought into the desired position.

Mounted on the other ends of the cantalivers C C' or framework, or opposite the loop, is the weight-box F, adapted to be loaded with sand, rocks, or other suitable material, which in this construction is stationary or permanently attached to the ends of the cantalivers C C' by means of bolts $f$. (See Fig. 6.) The weight-box F is preferably constructed with a hinged side and an inclined bottom to facilitate the emptying of the same when it is desired to move the loop A along the main line B.

$f'$ represents the hinges on which one side of the box opens, and $f^2$ represents bolts or other suitable devices for securing the side in its closed position.

The manner of securing the rails of the loop A to the main line B is fully illustrated in Figs. 7, 8, and 9, in which B represents the rail of the main line, and A the rail of the loop. The rail A of the loop is inclined on the under side to rest on the bulb or top of the main line B, so that the loop-rail A is inclined to the main line B at a suitable inclination. The extremity of the loop-line A is constructed with lugs $a$, (see Fig. 9,) which project down each side of the bulb of the main line B. The rails are also connected by means of a strap H, which strap passes through a slot $a'$ or hole formed in the web of the loop-line A, projects downward at either side, and is formed with holes $h$ for a gib $h'$ and key $h^2$, which pass underneath the bottom of the rail of the main line B. By driving the key $h^2$ in one direction the two rails A B are firmly connected, and they may be as readily disconnected by driving the key $h^2$ in the opposite direction.

A rail or other support K is preferably arranged beneath the cantalivers C C' below the weight-box F.

The main line B, as shown in Fig. 1, is, as usual, laid near the edge or face of the dump or depositing-site, so that when the loop A is on the main line B it overhangs the face of the dump or depositing-site for a suitable distance. The cars, trucks, or other vehicles G conveying the material to be dumped or deposited are run off the main line B onto the loop A and emptied of their contents beyond the edge or face of the dump. (See Fig. 1.)

When the dump has been filled up to the level or approximately to the level of the loop A, the loop may be then run along the main line to overhang the face of the dump at another point. When necessary, the main line B will be relaid near the edge or face of the dump, so that the loop A will again overhang the face. Preparatory to moving the loop A on the main line B the straps H are removed to disconnect the rails of the loop and the main line. The weight-box F having been emptied or partially emptied of its contents to balance the loop, the framework or structure is then raised, by means of the screws $e^2$, so that it clears the top of the dump, and the whole structure is then moved bodily forward on the carriages or bogies E to the desired position on the main line B. The loop A is then lowered and again secured in position by means of the straps H and the weight-box F refilled.

Referring to the arrangement illustrated in

Figs. 10 and 11, the loop A is constructed in the same manner as in the preceding arrangement, with the exception that two additional stays D² are provided and lines L are provided at right angles to the loop for a truck or vehicle M, which serves as the weight-box. In operation the truck or vehicle M will be run into a position on the line L to counterbalance the weight of the overhanging portion of the loop A and the loaded car G. Means may be provided for securing the truck M in this position. When it is desired to move the loop A, the rails A are disconnected from the main line B, the truck M, constituting the weight-box, moved inward on the rails L toward the main line B, and the structure then raised to clear the top of the dump and the whole then traversed bodily along the main line B on the carriages or bogies E.

What we claim as our invention, and desire to protect by Letters Patent, is—

1. A portable loop for dumps or depositing-sites constructed to overhang the edge or face of the dump and arranged so that the trucks or vehicles conveying the material to be dumped can run off the main line onto the loop and after being emptied continued in the same direction along the loop to the main line or track, substantially as described.

2. A portable loop constructed to overhang the face of the dump or depositing-site and arranged so that the trucks conveying the material to be dumped may run off the main line onto the loop and after being emptied of their contents run off the loop onto the main line, carriages or bogies adapted to traverse the main line or track and means for raising the loop to transfer the weight thereof to said carriages or bogies, substantially as described.

3. A portable spur adapted to overhang the edge of the dump and arranged so that the vehicles conveying the material to be dumped can run off the main line onto the spur and back along the spur to the main line, carriages or bogies traversing the main line or track and means for raising the spur onto said carriages or bogies so that it may be traversed along the main line, substantially as described.

4. In a portable loop for dumps or depositing-sites the combination with the main line or track of the loop constructed to overhang the face of the dump, carriages or bogies for carrying the loop adapted to traverse the main line or track, means for raising the loop to transfer the weight thereof to said carriages or bogies and means for counteracting the weight of the overhanging portion of the loop and loaded truck or vehicle when it is run onto the loop, substantially as described.

5. In a portable spur for dumps or depositing-sites the combination with the main line of the spur constructed to overhang the edge of the dump, carriages or bogies adapted to traverse the main line for carrying the spur, means for raising the spur to transfer the weight thereof to said carriages or bogies and means for counteracting the weight of the overhanging portion of the spur and the loaded car or vehicle when it is run onto the spur, substantially as described.

6. In a portable loop for dumps or depositing-sites, the combination with the main line of the loop constructed to overhang the face of the dump, carriages or bogies adapted to traverse the main line for carrying the loop, means for raising the loop to transfer the weight thereof to said carriages or bogies and adjustable means for counteracting the weight of the overhanging portion of the loop and the loaded car when it is run onto the loop, substantially as described.

7. In a portable loop for dumps or depositing-sites, in combination, a portable loop adapted to overhang the face of the dump, means for detachably connecting the rails of the loop to the rails of the main line, said means consisting in forming the under side of the rail of the loop at an inclination and in forming at or in proximity to the end thereof lugs which project down the sides of the bulb of the main rail, and a strap or straps which pass through the web of the loop-rail and project down the sides of the main line and are secured underneath the rail of the main line, substantially as described.

8. In a portable loop for dumps or depositing-sites, in combination, a portable loop adapted to overhang the edge of the dump, means for detachably connecting the rails of the loop to the rails of the main line, said means consisting in forming the under side of the rail of the loop at an inclination to the bulb of the main line and in forming at or in proximity to the end thereof lugs or projections which project to either side of the bulb of the main line, and a strap or straps which pass through the web of the loop-rail and project down the sides of the main line, and keys and cotters carried by the lower extremities of said straps for fixing the loop-rail to the main rail, substantially as described.

9. In a portable loop for dumps or depositing-sites, in combination, a portable loop constructed to overhang the face of the dump, means for counterbalancing the weight of the overhanging portion of the loop and the weight of the loaded car when it is run onto the loop, said means consisting of a weight-box secured to the main frame or structure opposite the loop and provided with an inclined bottom to facilitate the discharging of the contents or a portion of the contents of said box to balance the loop, and doors or hinged sides for emptying or partially emptying the weight-box substantially as described.

10. In a portable loop for dumps or depositing-sites, in combination, a portable loop constructed to overhang the edge of the dump, means for counterbalancing the weight of the overhanging portion of the loop and the weight of the loaded car when it is run onto the loop, said means consisting of a suitably-loaded truck adapted to traverse rails carried by the main frame or structure at right angles to the loop, substantially as described.

11. In a portable loop for dumps or depositing-sites the combination with the overhanging loop of carriages or bogies for carrying the loop arranged to traverse the main line, and means for raising the loop to transfer the weight thereof to said carriages, consisting of screws supported by said carriages or bogies and attached to the members of the main frame or structure, said screws being movable vertically to raise the main structure, and means for raising or lowering the screws, substantially as described.

12. In a portable loop for dumps or depositing-sites, the combination with the main line of a loop constructed to overhang the face of the dump, means for attaching the ends of the rails of the loop to the rails of the main line, means for moving the loop along the main line, and means for counteracting the weight of the loop and loaded truck when it is run onto the loop, substantially as described.

13. In a portable loop for dumps or depositing-sites the combination with the main line of a loop constructed to overhang the face of the dump, carriages or bogies adapted to traverse the main line, means for attaching the extremities of the rails of the loop to the rails of the main line, means for raising the structure carrying the loop to transfer the weight thereof to the carriages or bogies, a weight-box carried by the frame or structure opposite the loop, and means for discharging or partially discharging the contents of said weight-box, substantially as described.

14. In a portable loop for dumps or depositing-sites, in combination, the main line, the loop, the cantalivers and supports carrying said loop, braces or stays attached to said cantalivers and supports, carriages or bogies adapted to traverse the main line, screws carried by said carriages or bogies attached to the cantalivers, nuts for raising said screws to lift the structure to transfer the weight thereof to said carriages or bogies, a weight-box carried by the structure opposite the loop, said weight-box being constructed with an inclined bottom and hinged sides for facilitating the emptying of the same, and a rail or support for the structure arranged beneath the weight-box, substantially as described.

15. In a portable loop for dumps or depositing-sites, in combination, the main line, the loop and the cantalivers and supports carrying the same, the lugs formed on the ends of the rails of the loop-line projecting down the sides of the bulb of the rails of the main line, the straps passing through holes formed in the flanges of the rails of the loop-line and secured beneath the rails of the main line by cotters and keys, braces or stays attached to the cantalivers and supports, carriages or bogies adapted to traverse the main line, screws carried by said carriages or bogies attached to the cantalivers, nuts for raising said screws to lift the structure to transfer the weight thereof to said carriages or bogies, rails laid on the structure at right angles to and opposite the loop, a suitably-loaded truck or vehicle arranged thereon and movable along the rails for counterbalancing the weight of the overhanging portion of the loop and the loaded vehicle when it is run thereon, and a rail or support arranged beneath the structure at the side opposite the loop, substantially as described.

16. In a portable loop for dumps, the combination with the main line, of a loop constructed to overhang the face of the dump, and means for counterbalancing the weight of the loop.

17. In a portable loop for dumps, the combination with the main line, of a loop constructed to overhang the face of the dump, and means for counterbalancing the weight of the loop, and means independent of the loop for increasing the counterbalancing means when a loaded car is run onto the loop.

18. In a portable loop for dumps, the combination with the main line, of a loop constructed to overhang the face of the dump, a counterbalance for said loop, and means independent of the loop for increasing or diminishing the counterbalance.

In witness whereof we have hereunto set our hands in the presence of two subscribing witnesses.

HENRY ARNALL PENBERTHY.
JOHN BENJAMIN PITCHFORD.

Witnesses:
CHAS. OVENDALE,
R. OVENDALE.